United States Patent [19]
Daniels et al.

[11] Patent Number: 5,758,126
[45] Date of Patent: May 26, 1998

[54] CUSTOMIZABLE BIDIRECTIONAL EDI TRANSLATION SYSTEM

[75] Inventors: Tracy J. Daniels, Columbus; Sheila W. Goad, West Worthington; Kevin F. Maisano; James M. Motyka, both of Dublin; Matthew D. Reiser, Gahanna; David L. Suffecool, Hilliard, all of Ohio

[73] Assignee: Sterling Commerce, Inc., Dallas, Tex.

[21] Appl. No.: 616,910

[22] Filed: Mar. 19, 1996

[51] Int. Cl.$^6$ .................................................. G06F 17/28
[52] U.S. Cl. .................... 395/500; 395/200.05; 705/37; 707/507
[58] Field of Search .................... 395/500, 575, 395/200.01, 200.05, 149, 148, 326, 12, 768; 364/401, 408, 468.01, 400; 380/23, 25; 370/110.1

[56] References Cited

U.S. PATENT DOCUMENTS

| | | | |
|---|---|---|---|
| 4,951,196 | 8/1990 | Jackson | 364/401 |
| 5,063,507 | 11/1991 | Lindsey et al. | 364/408 |
| 5,285,383 | 2/1994 | Lindsey et al. | 364/408 |
| 5,315,504 | 5/1994 | Lemble | 364/400 |
| 5,337,360 | 8/1994 | Fischer | 380/23 |
| 5,367,664 | 11/1994 | Magill et al. | 395/575 |
| 5,390,247 | 2/1995 | Fischer | 380/25 |
| 5,410,646 | 4/1995 | Tondevold et al. | 395/149 |
| 5,410,675 | 4/1995 | Shreve et al. | 395/500 |
| 5,432,792 | 7/1995 | Burkart et al. | 370/110.1 |
| 5,485,369 | 1/1996 | Nicholls et al. | 364/401 |
| 5,490,243 | 2/1996 | Millman et al. | 395/148 |
| 5,557,780 | 9/1996 | Edwards et al. | 395/500 |
| 5,570,291 | 10/1996 | Dudle et al. | 364/468.01 |
| 5,583,981 | 12/1996 | Pleyer | 395/326 |
| 5,627,940 | 5/1997 | Rohra et al. | 395/12 |
| 5,640,501 | 6/1997 | Turpin | 395/768 |
| 5,640,577 | 6/1997 | Scharmer | 395/768 |

OTHER PUBLICATIONS

"Electronic Data Interchange: A Research Agenda", by c. Bruce Kaven and David Van Over, IEEE System Sciences, 1990 Annual Hawaii Int'l. Conference, pp. 192–198.

"Electronic Data Interchange", by Coen M.A. Kreuwels, IEEE Jerusalem Conference on Information Technology, 1990, pp. 214–224.

"The Development of an EDI System", by B.K. Blacker, IEEE Computing and Control Engineering Journal, Sep. 1991, pp. 231–237.

"EDI Technology Implementation in the Australian Educational Sector", by L. Lim and J. Fletcher, TENCON '94—1994 IEEE Region 10 Conf. on Frontiers, pp. 20–24.

"Redeisigning Process Control Mechanisms Using EDI: An Agency–theoretic Perspective", by H. van der Heijden et al., IEEE Proceedings of the 28th Annual Hawaii Int'l Conference on System Sciences, 1995, pp. 388–397.

"DoD Electronic Conference/Electronic Data Interchange (EC/EDI) Systems Modeling and Simulation", by K. Jo et al., IEEE MILCOM '95, Universal Communications Conference, 1995, pp. 479–483.

*Primary Examiner*—Kevin J. Teska
*Assistant Examiner*—Russell W. Frejd
*Attorney, Agent, or Firm*—Baker & Botts, L.L.P.

[57] ABSTRACT

An electronic forms application presents a graphical user interface (GUI) on the display of a computer. The GUI includes a plurality of information accepting fields which accept entry of, and present information in, human readable form. The electronic forms application is operative to accept an EDI data transmission, translate the EDI data into human-readable form and present the data in the information accepting fields of the GUI. The electronic forms application is further operative to accept and verify information manually entered into the information accepting fields of the GUI, extract the information entered into the information accepting fields, translate the information into EDI data and transmit the EDI data to a destination location.

34 Claims, 9 Drawing Sheets

COMMERCE:Forms Purchase Order

General Information
*Purchase Order Number
42 — EZ 000012

Header Information
Requested Ship Date — 46
01/26/96

Cancel After Date
02/20/96

*Order Date — 42
01/24/96

Do Not Deliver Before Date
01/24/96

Internal Vendor Number
V-93932932

45

Ship To:
*ID: 172637
Name: Company 1
Address: Company 1 Address
Address:
City/Town: Beverly Hills
State: CA    Post/Zip: 90210–

Contact Information
*Ordered By: YOUR NAME
Job Title: ADMINISTRATOR
*Phone No: (283) 282-3832

41 — Header | Detail
41

*Red Label Designates a Required Field

Save
Cancel
Help (F1) — 47

FIG. 4a

COMMERCE:Forms

Transaction Purpose [ 52a ]  Shipment ID [ ]

Shipment
Ship Date          Scheduled Delivery Date       Bill of Lading Number    4-digit SCAC Code
MM/DD/YY           MM/DD/YY
[01/17/96]         [01/17/96]                    [BL6]                    [BL6]

Packaging          Gross Weight (LBS)            Equipment Description
[ ]                [ ]                           [ ]

Carrier's Pro/Invoice Number                     Payment Method            Transportation Method Type
[ ]                                              [ ]                       [ ]

Routing
[ ]

| Screen 1 | Screen 2 | Screen 3 |

Red Labels designate REQUIRED Fields

Help   Print   Cancel   Save

CUSTOMIZABLE BIDIRECTIONAL EDI TRANSLATION SYSTEM

FIELD OF THE INVENTION

This invention relates to electronic data interchange (EDI). More specifically, preferred embodiments of this invention relate to a method and apparatus which allow EDI data to be converted to human-readable data and human-readable data to be converted to EDI in a simplified manner.

BACKGROUND

The needs of the typical computer user can no longer be met through the use of a single, isolated personal computer. Instead, users generally require communication with other components for accessing data or processing capability not available locally. These components may be present as part of a network in a typical client/server architecture or they may be located anywhere throughout the world and accessible through an agreed upon communications protocol.

Many businesses have become dependent on these so-called "distributed" systems for accessing, storing and processing data generated by or required by the business. The components which are accessed using the client (or a dumb terminal) may be part of the businesses' network or they may be components operated by affiliated or unaffiliated third parties. Electronic Data Interchange (EDI) allows businesses to exchange many kinds of data with each other electronically. Electronic data interchange (EDI) is the direct application to application transmission of business documents such as purchase orders, invoices and remittance advice. Businesses immersed in electronic commerce (EC) (the electronic flow of business information between organizations, for example, trading partners) have found EDI to be a vital component of their enterprise. EDI differs from more elementary forms of electronic communication in that it provides for truly integrated information flow. At the transmitting end, EDI functionality extracts information from an application, for example, an accounting or inventory management program, and transmits the information via telephone lines and/or other communications paths. At the receiving end, the data can be fed directly into a computer system and automatically processed and interfaced with internal applications of that system with a minimum of user intervention.

EDI typically requires a computer, EDI management and translation software, communications hardware (for example, a modem) and software and a communication medium (for example, telephone lines). A wide range of computer systems may be used to implement EDI. For example, an EDI system may be implemented using a mainframe accessible through microcomputer systems. EDI management software extracts outgoing data from and inserts incoming data into an internal application. That is, EDI management software translates application specific data to data in an EDI standard and data in an EDI standard to application specific data. An EDI standard is a message format which regulates the syntax, structure and content of the EDI data and which is used to create computer-readable (as opposed to human-readable) versions of paper documents. There are a number of EDI standards currently being used, for example, EDIFACT, ANSI X12, UCS, TDCC, VICS, EDX, ODETTE and TRADACOMS. EDI management software may accommodate more than one of the abovementioned EDI standards.

Many EDI users connect to an EDI network or a value-added network (VAN). A VAN makes it possible to bundle all of a user's transmissions into a single transmission. In this sense, a VAN acts as a clearinghouse for a company's EDI communications. Further, a VAN typically provides services such as E-mail notification to a receiver of a transmission and translation from one EDI standard to another thereby enabling EDI-capable computers operating in different standards to be interconnected. A VAN also safeguards data integrity and security by providing a buffer between sender and receiver.

EDI makes it possible to exchange data without ever rekeying the original transaction information stored in computer files. By using EDI, a company can send business documents directly from internal computer applications to a trading partner's computer system without human intervention. EDI thus minimizes staff involvement and reduces delays and errors that accompany manual processing of business documents. Further, by simplifying and streamlining business procedures, EDI can help a company control costs, increase efficiency and improve customer service levels.

EDI is most effective where all of a particular companies trading partners are EDI-capable or "on-line." If one of a particular companies trading partners is not on-line, then all transactions with that trading partner must be accomplished by, for example, exchanging paper documents. These documents are typically exchanged via mail or fax and the information they contain must be manually keyed into the computer system of the company. Such a manual transaction process is inefficient, slow and prone to human error.

EDI services may, however, be cost prohibitive for some parties. For example, using EDI effectively may require employees with a greater level of computer literacy thus leading to higher salary and training costs than a party is willing or able to support. Further, setup costs, for example, the cost of EDI management software, may be prohibitive in and of themselves. EDI may also require more advanced computer facilities then are accessible by a party.

SUMMARY OF THE INVENTION

Accordingly, a need has arisen for an EDI system which enables users to access an EDI network and exchange EDI data in a simple and inexpensive way.

Further, a need has arisen for a simple and inexpensive way for a party to maximize the number of trading partners who are capable of communicating via EDI.

It is one object of the present invention to provide a customizable user-application which converts EDI data to human-readable data and human-readable data to EDI data.

It is another object of the present invention to provide a user-application which provides a graphical user interface which mimics the form of a paper transaction record such as a purchase order or invoice and which translates human-readable data into EDI data and EDI data into human-readable data.

Preferred embodiments of the present invention allow a non-EDI capable party to communicate with an EDI capable party through the use of an electronic forms application. In a typical embodiment, an EDI capable party (hereinafter "sponsor" or "sponsor client") furnishes their non-EDI capable trading partners (hereinafter "user" or "user client") with an electronic forms application specific to their trading needs. The electronic forms application may comprise a number of electronic forms. Further, each electronic form comprises a graphical user interface (GUI) having fields which accept and display data in human-readable form. The electronic forms application allows the user to enter information into the fields of the GUI. The information entered into the fields is subsequently translated into EDI data by processing underlying the form and transmitted to the sponsor, for example, through an EDI network to which the sponsor subscribes. The electronic forms application preferably includes instant editing functionality which verifies information entered in the fields of a form against an acceptable format or a database of acceptable entries and thus provides the user of the electronic forms application with immediate feedback about the acceptability of an entry into one of the fields of the form.

The electronic forms application also allows the user to receive EDI data. For example, the sponsor generates an EDI transmission and sends the transmission to the user through a value-added network. The electronic forms application enables the user to access the transmission from a mailbox accessible to both the sponsor and the user, for example, a mailbox within the value-added network. The content of the transmission comprises an identification of an electronic form from the electronic forms application to be used and EDI data. When the transmission is accessed by the user from the mailbox, the identified electronic form is displayed on the user's computer by the electronic forms application and the EDI data is translated into human-readable format and used to populate the fields of the electronic form.

The preferred embodiments of the present invention have utility in a number of ways. A user of the electronic forms application does not have to be familiar with EDI in order to reap the benefits of EDI. Further, a user of the electronic forms application is not required to have any EDI-specific software or hardware on the their computer. The user of the form needs only a means of communicating with the sponsor, for example, a modem, and a mailbox address where EDI trasmissions can be deposited for the user, for example, a mailbox within a value-added network. Use of the electronic forms application also ensures accuracy of EDI transmissions because of the instant editing capabilities of the electronic forms application. Still further, by supplying its trading partners with the electronic forms application, the sponsor is able to conduct a greater percentage of business via EDI and thus increase efficiency.

BRIEF DESCRIPTION OF THE DRAWINGS

The features and objects of the present invention, and the manner of attaining them is explained in detail in the following DETAILED DESCRIPTION OF THE PREFERRED EMBODIMENTS of the invention when taken in conjunction with the accompanying drawings wherein:

FIG. 4a depicts a GUI corresponding to a first screen of an exemplary electronic purchase order according to one embodiment of the present invention.

FIG. 5a depicts a GUI corresponding to a first screen of an exemplary electronic advance ship notice according to one embodiment of the present invention.

FIG. 5b depicts a GUI corresponding to a second screen of an exemplary electronic advance ship notice according to one embodiment of the present invention.

FIG. 5c depicts a GUI corresponding to a third screen of an exemplary electronic advance ship notice according to one embodiment of the present invention.

DETAILED DESCRIPTION OF THE PREFERRED EMBODIMENTS

Figure 1:
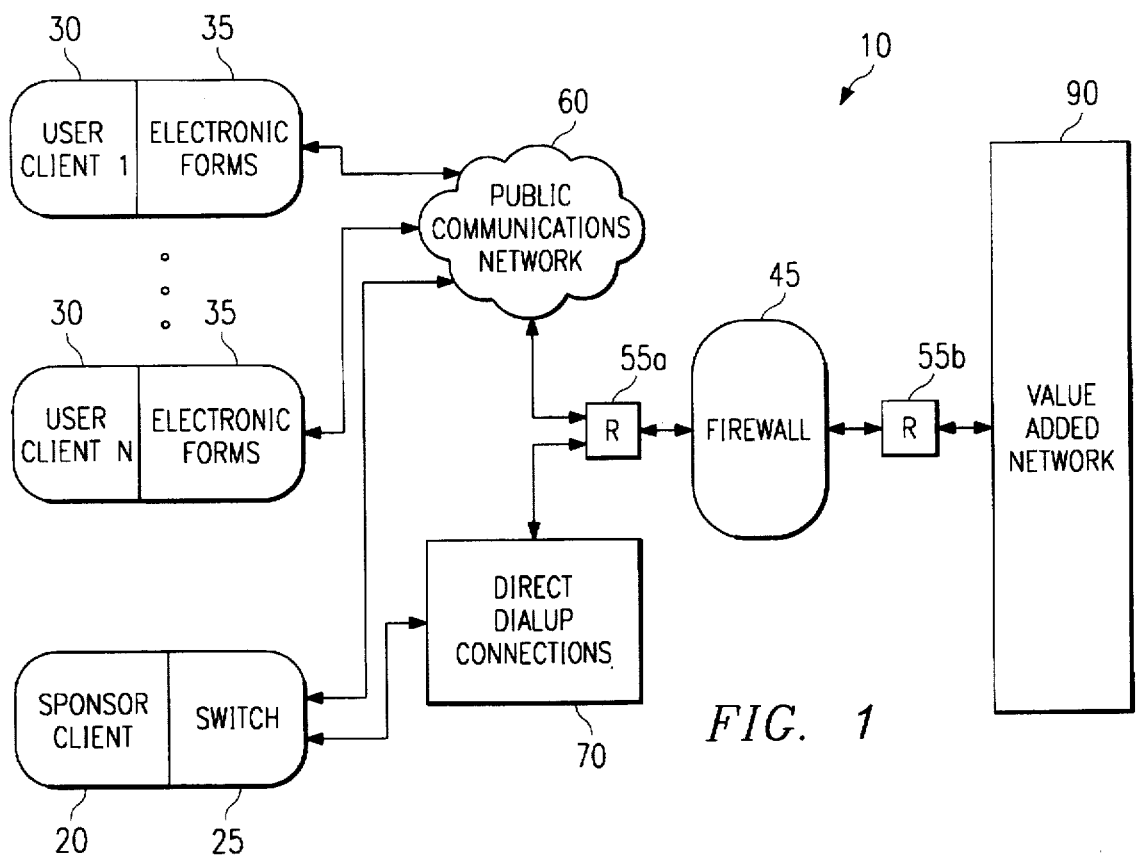
FIG. 1 depicts the operational environment for an electronic forms application according to one embodiment of the present invention.
Figure 2:
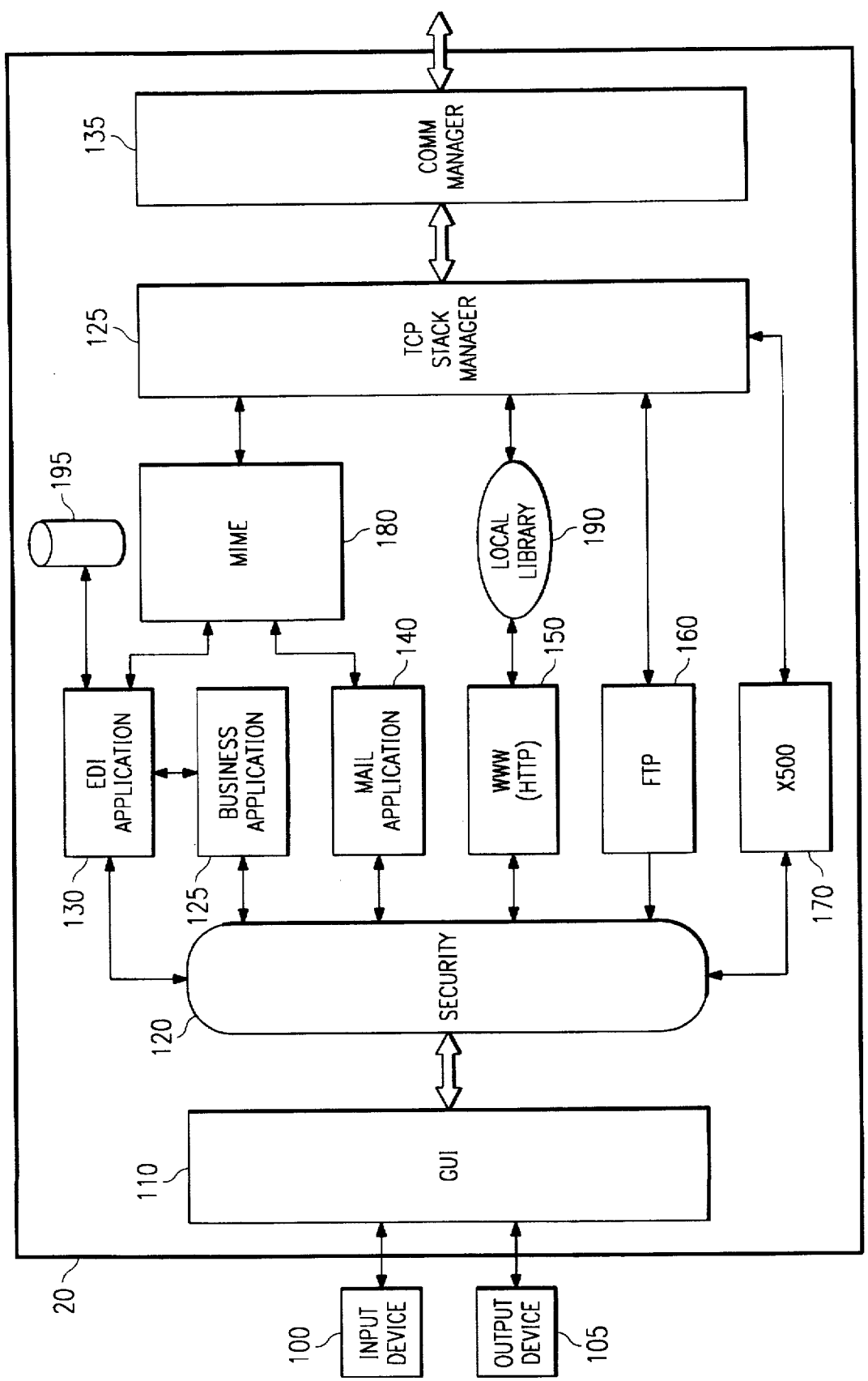
FIG. 2 depicts a functional block diagram of a client system used by a sponsor of an electronic forms application according to one embodiment of the present invention.

Referring to FIG. 1, an operational environment for an electronic forms application according to preferred embodiments of the present invention is shown. Electronic forms processing system (EFPS) 10 includes sponsor client 20 communicating with user clients 30 through a value added network (VAN) 90. Sponsor client 20 communicates with user client 30 and accesses data and applications resident on VAN 90 through either or both of public communications network (PCN) 60 and direct dialup connection (DDC) 70. Sponsor client 20 includes switch 25 for selecting communication over PCN 60 or DDC 70. Sponsor client 20 which will be explained in more detail in conjunction with FIG. 2, is typically a computer which is EDI capable. User clients 30 communicate with VAN 90 through DDC 70 or through PCN 60. User clients 30 access electronic forms application 35 which provides user clients 30 with the ability to send and receive EDI data according to the preferred embodiments of the present invention. In a preferred embodiment, user clients 30 are computers which are not typically EDI capable. EFPS 10 may include any number of sponsor clients 20 and user clients 30 as long as the available bandwidth and transmission resources can reasonably accommodate them. Further, VAN 90 may comprise a computer system having one or more applications, various databases and communications applications which provide access to other clients in the EFPS 10. In one embodiment, VAN 90 may comprise one or more processors dedicated to the task of accepting, processing and transmitting EDI data.

DDC 70 preferably comprises a communications medium capable of interconnecting two processors according to a standard protocol available and known to both processors. In a preferred embodiment of the present invention, DDC 70 comprises an X.25 communications network running through an X.25 communications server. The X.25 network may, for example, comprise an online service such as Compuserve™ operated by Compuserve, Inc., located in Columbus, Ohio. DDC 70 operates to provide a secure connection between sponsor clients 20, user clients 30 and VAN 90. Alternatively, DDC 70 may be any communications server capable of providing a secure connection between sponsor clients 20, user client 30 and VAN 90.

PCN 60 comprises a plurality of interconnected processors and/or servers. PCN 60, in a preferred embodiment, comprises an interconnection of networks commonly known as the "Internet". Similarly, any public communications network may be employed in connection with the present invention. Traffic originating from sponsor clients 20, user clients 30 and VAN 90 are directed to the appropriate locations within PCN 60 by router systems within PCN 60.

In a preferred embodiment both PCN 60 and DDC 70 interface with router 55a prior to completing the communications path to VAN 90. Following router 55a, EFPS 10 preferably includes at least one firewall 45 and at least one additional router 55b prior to completing the communications path to VAN 90. As is known in the art, firewall 45 is a security device blocking attempts by unauthorized people to access VAN 90. It should be noted that EFPS 10 may contain additional routers and firewalls between PCN 60 and DDC 70 (collectively) and VAN 90. Additional firewalls will provide additional security within VAN 90.

Routers 55a and 55b read addressing information contained in packets to most efficiently transmit these packets to their destination. PCN 60 also typically contains many routers through which traffic in PCN 60 flows. As is known in the art, DDC 70, in its embodiment as an X.25 network contains multiple pads which serve to route traffic in a similar manner to the routers contained in PCN 60.

Traffic traveling through both PCN 60 and DDC 70 consists of packets of information which are routed to the designated recipient. In the case of EFPS 10, packets originating from any client (sponsor or user) may be routed to VAN 90 or to any other client within EFPS 10. In the case of traffic traveling through PCN 60, data is not secure in that it may be relatively easily intercepted and compromised at various locations within the network. In contrast, DDC 70 provides a secure communications link between the various clients and VAN 90 such that information can not be intercepted and/or compromised.

In a preferred embodiment of the present invention, sponsor client 20 and user clients 30 communicate through PCN 60 and DDC 70 using Point to Point Protocol (PPP). This protocol allows for the transmission of TCP/IP packets utilizing a high speed modem over a single telephone line. It also provides an architecture wherein multiple sessions may be operated simultaneously through a single connection (although possibly through multiple communications paths). Alternatively, Serial Line Internet Protocol (SLIP) may be used to connect through PCN 60 or DDC 70 to VAN 90 in order to achieve the same advantages. By using these protocols, a single asynchronous connection may be used for all communications traffic within EFPS 10. In this way, each of sponsor clients 20 and user clients 30 may simultaneously communicate with VAN 90. In fact, each client may concurrently communicate data respecting multiple applications so that multiple tasks or sessions may occur between an individual client and VAN 90 at one time.

As mentioned above, Point-to-Point Protocol (PPP) allows TCP/IP connectivity over a non-dedicated line. DDC 70, in its form as an X.25 packet switched network, allows for world-wide, packet based connectivity, with local dial access.

Turning now to FIG. 2, specific detail concerning a sponsor client 20 subsystem of EFPS 10 is provided. It is to be understood that sponsor client 20 may take various forms and may have expanded or more limited functionality as compared with the functionality described herein. In one embodiment of the present invention, sponsor client 20 comprises a personal computer (PC) for communicating with VAN 90. In this same embodiment, VAN 90 comprises a mainframe computer for processing electronic commerce according to a particular EDI standard or according to multiple EDI standards. It should be noted, however, that sponsor client 20 could be any computing device capable of running at least some of the below described applications (or other similar applications) and VAN 90 could be any computing device maintaining applications which are accessed by sponsor client 20.

Sponsor client 20 represents an intelligent sponsor client capable of performing processing by itself as opposed to a dumb terminal which has little or no processing capability. Sponsor client 20 of the present invention also preferably contains memory, at least one processor for running local applications, an input device 100 and an output device 105. Graphical user interface 1 10 comprises a set of applications for displaying information at output device 105 and for prompting a user to input necessary information at input device 100. One or more security applications 120 may be provided as part of sponsor client 20 and controlling the flow of data between GUI I 10 and the various functional applications contained within sponsor client 20. Security applications 120 may serve to prevent unauthorized access to particular applications or all applications. Security applications 120 may comprise a password/validation check or they may be more complex security mechanisms implemented in either hardware or software as is known in the art.

Sponsor client 20, in a preferred embodiment, is a PC providing access to VAN 90 which is a host computer for performing electronic data interchange including various value added services. As such, in this embodiment, sponsor client 20 contains a number of applications which are run locally at sponsor client 20, but used in conjunction with applications running on VAN 90. Exemplary sponsor client applications are provided below. It should be noted, however, that these particular applications in no way make up the universe of potential sponsor client applications which could be used in connection with the present invention.

The first sponsor client application is business application 125. In a preferred embodiment, business application is a sophisticated application capable of performing various business related tasks for sponsor client 20. Business application 125 may comprise an application residing locally on sponsor client 20 or may comprise an application distributed across a network of computers of a business enterprise. In one embodiment, business application 125 comprises functionality capable of keeping track of order information for a business enterprise. For example, business application 125 is capable of automatically receiving and processing purchase orders generated by a customer of sponsor client 20, for example, user client 30.

The next sponsor client application is EDI application 130. In a preferred embodiment, EDI application 130 comprises the Gentran:Director™ software package distributed by Sterling Software, Inc. located in Dublin, Ohio. This EDI package provides for automatic electronic commerce to occur between various trading partners who have access to EFPS 10. The Gentran:Director product allows a user to fully manage EDI processing through various navigation tools. In addition, trading partners may be defined and documents for exchange may be specified. In a preferred embodiment, EDI application 130 communicates through a Multipurpose Internet Mail Extensions (MIME) compatible encoder 180. The MIME encoder 180 encodes data such as printable ASCII text into a format suitable for transmission as E-mail. EDI application 130 may access and store data in connected database 195.

As shown in FIG. 2, EDI application 130 and business application 125 interface with each other. In this way, sponsor client 20 is able to communicate with remote sites via EDI. That is, EDI application 130 translates data from business application into EDI data and translates EDI data received by sponsor client 20 into data usable by business application 125. For example, if business application 125 on sponsor client 20 generates a purchase order in response to information from one of the remote sites, EDI application can translate the purchase order to EDI data to be sent to the appropriate supplier. In one embodiment, the translation takes place as follows. Business application 125 communicates with EDI application 130 through an application-EDI interface contained within EDI application 130. The application-EDI interface is designed to facilitate communication between the specific business application 125 being used and EDI application 130. Typically, the application-EDI interface converts the purchase order into a fixed length file for translation into EDI. EDI application 130 then converts the fixed length file into an EDI file, in the appropriate EDI standard. The EDI file is then transmitted through EFPS 10 as explained above.

The next sponsor client application employed in a preferred embodiment of the present invention is a sophisticated mail processing application 140. In a preferred embodiment of the present invention, mail processing application 140 is Commerce: Mail™, which is distributed by Sterling Software, Inc. This application is an E-mail application that allows sponsor client 20 to send and receive E-mail messages with and from trading partners. Mail application 140 preferably provides conventional E-mail functionality with support for X.400 users, the Internet, and open addressing. Mail application 140 preferably routes output through MIME encoder 180 prior to transmission to VAN 90.

World-Wide-Web application 150 allows sponsor client 20 to access world wide web pages which are located either on PCN 60 or at VAN 90. The world wide web is a large scale information service that allows a user to browse information using a hypermedia linking system providing ease of use and efficient access to desired information. Particular (possibly often used) world wide web pages may be stored locally in local library 190 for quick access.

File transfer protocol (FTP) application 160 allows sponsor client 20 to download a file or any type of information from VAN 90 or which is located on PCN 60 which is preferably the Internet. Similarly, FTP application 160 allows a sponsor client 20 to upload a file to these same remote locations. FTP is a TCP/IP standard for transferring files from one location to another.

Finally, an X.500 directory 170 may be provided so as to indicate and specify attributes relating to subscribers of VAN 90. The X.500 may also contain vendor identifiers and addresses as well as additional information about the vendors (profiles) so that information about such vendors may be accessed as part of an open standard (X.500) by many applications.

Sponsor client 20 also preferably contains TCP stack manager 125 for breaking application data down into TCP packets and attaching the required header information as is known in the art. In one embodiment, TCP stack manager may be the Winsock applications programming interface (API) included with the Windows 95 operating system distributed by the Microsoft Corporation for customizing packet generation. Communications manager 135 functions to control the reception and transmission of packet data to and from sponsor client 20, respectively.

Figure 3:
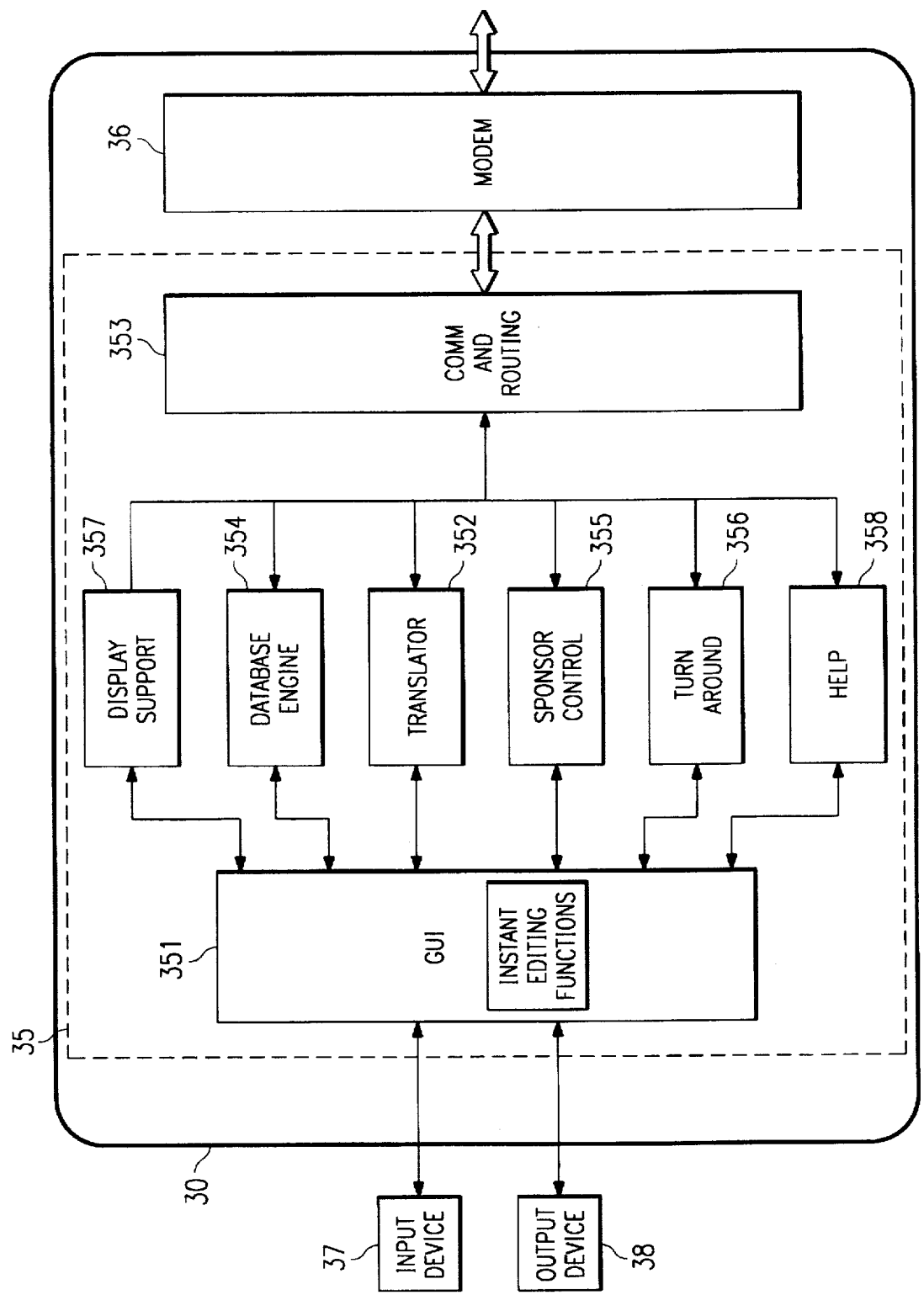
FIG. 3 depicts a functional block diagram of a client system used by a user of an electronic forms application according to one embodiment of the present invention.

FIG. 3 provides specific detail regarding user client 30 subsystems of EFPS 10. Similar to sponsor client 20, in one embodiment of the present invention, user clients 30 comprise a PC communicating with VAN 90. In contrast to the complex assortment of software and hardware used by sponsor client 20 to communicate with VAN 90, user client 30 communicates with VAN 90 through an electronic forms application 35 and modem 36. In a preferred embodiment, electronic forms application 35 is an application running locally on user client 30 and providing user client 30 with the capability to communicate via EDI with sponsor client 20. User client 30 comprises memory, a processor for running electronic forms application 35 and other local applications, an input device 37, for example, a keyboard and/or a mouse, an output device 38, for example, a monitor, and a modem 36. Modem 36 is any modem capable of providing communication with VAN 90 and in a preferred embodiment is an asynchronous modem and could be a 2400, 4800/9600, 14,400, 28,800 bits/sec or faster speed modem (up to and including T1 speeds) with MNP support.

In a preferred embodiment, electronic forms application 35 is a user-friendly application which is used in place of or in addition to the various local applications residing on sponsor client 20 which enable sponsor client 20 to communicate via EDI. Electronic forms application comprises a GUI 351, a translator module 352, a communications and routing module 353 and a number of functional modules 354-357. GUI 351 is displayed by electronic forms application 35 at output device 38 and allows a user to access the functionality of electronic forms application 35 through input device 37. Translator module 352 operates to convert EDI data into human-readable data and human-readable data into EDI data depending on whether electronic forms application 35 is receiving or sending data. Communications and routing module 353 provides an interface between electronic forms application 35 and modem 36 thus enabling communication between user client 30 and sponsor client 20. For example, in one embodiment communications and routing module 353 enables electronic forms application 35 to exchange EDI transactions with sponsor client 20 using a mailbox provided within EFPS 10. Communications and routing module 353 also provides initial routing for incoming communications as will be explained below. The various functional modules 354-357 provide electronic forms application 35 with a number of capabilities which render electronic forms application 35 user-friendly and will be explained in more detail below. It should be noted that there are other functional modules which might be included in electronic forms application 35 and further, that the amount of functionality included depends upon the level of sophistication desired by the sponsor of electronic forms application 35.

GUI 351 comprises a number of screen displays including controls which enable a user to utilize electronic forms application 35. GUI comprises two functional aspects a main menu and electronic form representations. The main menu provides user client with overall control of electronic forms application 35. That is, in a preferred embodiment, the main menu screen comprises a tool bar with a number of buttons used to access available tools, a number of buttons corresponding to each of the electronic forms available and a listing indicating the sponsor client who is providing the electronic forms application 35.

The electronic forms representations provide a user client 30 with a graphical representation of a document typically used in commercial trading. GUI 351 may take the form of, for example, a purchase order, invoice, advance shipping notice or any other document used to record a commercial transaction. GUI 351 may comprise a single screen or a number of screens. FIGS. 4a, 4b and 5a–5c show examples of GUIs for an electronic purchase order and an electronic advanced ship notice respectively. As can be seen from FIGS. 4 and 5 the electronic purchase order and advance ship notice actually comprise a series of screens in the form of a tabbed dialogue with different screens accessible through tabs 41 and 51.

Further, as shown in FIGS. 4 and 5, GUIs also comprise a number of information fields 42 and 52 corresponding to information which is typically part of the commercial document represented by the electronic form (note that only two of the many information fields are referenced in order to simplify the drawings). Information fields 42 and 52 display information in human-readable form. The information displayed in information fields 42 and 52 is entered either by user client 30 or by sponsor client 20. For example, the information displayed in information fields 42 and 52 is entered by user client 30 through input device 37 to generate an electronic form, translated by translator 352 to EDI data and transmitted to sponsor client 20. Alternatively, information displayed in information fields 42 and 52 may originate at sponsor client 20 as EDI data. The EDI data is transmitted to user client 30 through communication network 10, translated into human-readable data by translator 352 and used to populate information fields 42 and 52 of GUI.

Also depicted as part of GUI 351 is instant editing functions block. Electronic forms application 35 includes a number of instant editing functions which help ensure that information entered into the information fields of GUI 351 is valid. The instant editing functions may be based on data form or substance. For example, if a user of electronic forms application 35 was filling in a purchase order and attempted to enter the character "a" in a date field requiring a numerical month-day-year data format, electronic forms application 35 would generate an indication of an invalid entry and prompt the user to reenter the date. Electronic forms application 35 may provide this type of format based instant editing for any information field within GUI 351. The instant editing functionality may also be based on substance, for example, the contents of a database. That is, entries to a particular field in an electronic form may be cross checked against the contents of a database. As an example, when a user is filling in detail item section 44 of the electronic purchase order shown in FIG. 4b, the list numbers entered may be cross checked against a database of valid list numbers. If an invalid list number is entered, electronic forms application 35 provides an indication to that effect. Alternatively, electronic forms application 35 may be setup so that entry of an invalid list number opens up the database of list numbers so that the user may scroll through the list numbers and choose an appropriate valid list number. As a further example of a substantive instant editing function, electronic forms application 35 may be setup to determine whether a particular order may be filled, for example, by checking an order quantity against a database of stock on hand.

Figure 6:
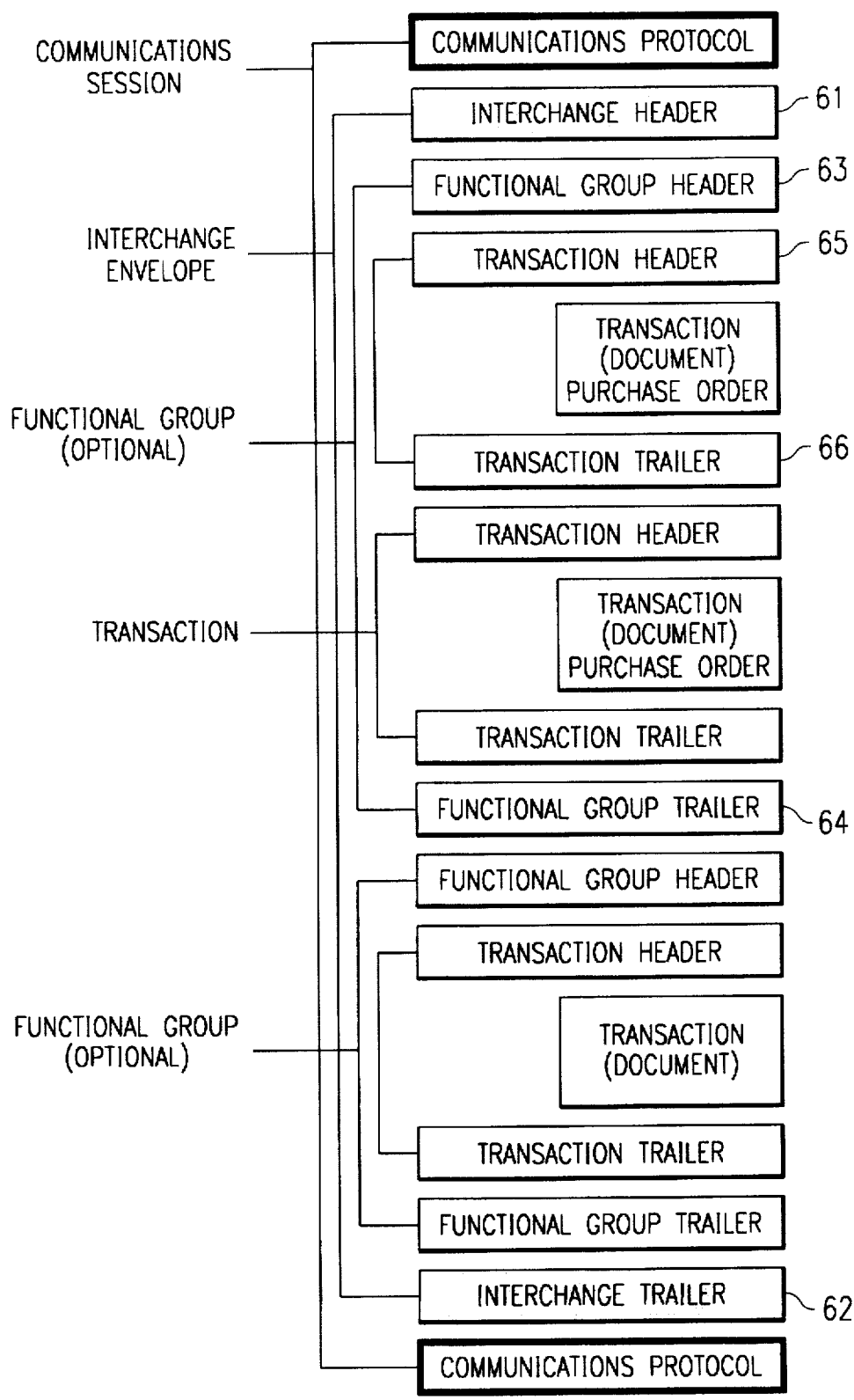
FIG. 6 is a schematic depiction of the arrangement of a typical EDI transmission according to one embodiment of the present invention.

In order to better understand the operation of translator module 352, it will be helpful to understand a typical EDI transmission. A typical EDI transmission can be analogized to a number of documents contained within an envelope. The enveloping structure comprises a number of levels. One exemplary enveloping structure is shown in FIG. 6. The outermost level of the envelope structure is the interchange. The interchange contains an interchange header 61 and trailer 62, and all the data sent from one sender to one receiver in the same transmission. The next level of the envelope structure inside the interchange is the functional group. The functional group contains a functional group header 63 and trailer 64 that surrounds a group of transaction sets of the same type. The final level of the envelope structure are the transaction sets. A transaction set contains information corresponding to information contained in a commercial document. Each transaction set is prefaced by a transaction set header 65 and succeeded by a transaction set trailer 66. The interchange, functional group and transaction set headers comprise identifying information including information used to interpret and transmit data contained within the envelope. For example, transaction set header 65 comprises information identifying the type of transaction contained within the transaction set, such as, information identifying the transaction as a purchase order.

Translator module 352, as stated above, converts human-readable data to EDI data and EDI data to human-readable data. Because each electronic form provided by electronic forms application 35 corresponds to a commercial transaction with a known format, generic translation software as is used in a typical EDI environment (for example, sponsor client 20) is unnecessary. The necessary translation from human readable data to EDI data and EDI data to human-readable data for each form within electronic forms application 35 is predefined and is preferably hard coded and thereby accomplished with minimal processing. For example, if a sponsor client 20 wishes to simplify the process by which user clients 30 order products from sponsor client 20, sponsor client 20 will supply user client 30 with electronic forms application 35 including an electronic purchase order such as is represented by the GUIs shown in FIGS. 4a–4b (that is, the embodiment of electronic purchase order in FIGS. 4a and 4b comprises two screens). User client 30 will navigate through the GUIs corresponding to the electronic purchase order and fill in information fields 42. Once complete, translator module 352 translates the purchase order into EDI. The transaction header may be predefined to identify the EDI transaction as a purchase order. Further, the information within the information fields is easily ordered into EDI data by translator module 352 because of the known format of the information fields within the GUIs.

Translation from EDI data to human readable data is also accomplished in a simplified manner. When a user client 30 receives an EDI communication, the communication is forwarded to translator module 352 by communications and routing module 353. Translation module 352 reads each transaction set header to determine the type of transaction and generates a GUI corresponding to the identified transaction set. When the appropriate GUI has been generated, the translator module 352 parses the EDI transmission into separate data elements and uses the data elements to populate the information fields in the GUI. As above, because the arrangement of information within the forms is known, the correspondence between the data elements of a transaction set and the information fields of the GUI is known and translation proceeds in a simplified manner. If electronic forms application 35 receives a transmission which is in an EDI format which is not recognized, or does not correspond to an electronic form contained within electronic forms application 35, an error message will be generated. The error message can take any suitable form, for example, an on-screen message that the transmission could not be translated, in combination with an automatic reply to the sender that the transmission was in an incompatible format.

Communications and routing module 353 enables a user client 30 to communicate with VAN 90. Thus, communications and routing module 353 enables a user client 30 to send and receive files, for example EDI transactions with sponsor client 20. As discussed above, user client 30 communicates with VAN 90 via PCN 60 or DDC 70. In still another embodiment, user client 30 communicates with VAN 90 via an 800 service. Once connected with VAN 90, in one embodiment, user client 30 communicates with sponsor client 20 through a mailbox within EFPS 10, for example a mailbox within VAN 90. In a preferred embodiment, the VAN 90 comprises Commerce Network™ provided by Sterling Software located in Dublin, Ohio which provides such network mailboxes.

Communications and routing module 353 also provides initial routing of incoming messages. In addition to receiving EDI communications in a standard format, electronic forms application 35 may also receive communications which are not in a standard EDI format, for example, file updates (to be explained in more detail in connection with sponsor control module 355 below). Therefore, when a message is retrieved by electronic forms application 35 a preliminary determination of the content of the message is made and the message is processed accordingly. In one embodiment, communications and routing module 353 accomplishes this determination by inspecting the communications envelope of an incoming communication, for example for a flag indicating the contents of the communication.

In another embodiment all or a portion of the communications and routing functionality may be provided by an external communications program. Such a communication program typically selectively establishes communication with a value added network either through PCN 60 or DDC 70. Such selective communication is enabled by including a switch, as shown and explained in conjunction FIG. I and sponsor client 20. This selective communication is discussed in more detail below. Further, an incoming communication such as a file update or an EDI transaction may by received and routed by the external communications program residing locally on user client 30. In one preferred embodiment, Commerce Connection™ provided by Sterling Software of Dublin, Ohio may accomplish the communications and routing of updated files.

A completed electronic form is transmitted by communications and routing module 353 in response to actuation of a communicate button from the tool bar within the main menu screen. Actuating the communicate button opens a dialogue prompting the user to choose immediate delivery or deferred delivery. In the case of immediate delivery, functionality of electronic forms application 35 is temporarily disabled while the transmission is completed. If deferred delivery is selected, then transmission takes place after a user client logs out of electronic forms application 35.

Figure 4B:
FIG. 4b depicts a GUI corresponding to a second screen of an exemplary electronic purchase order according to one embodiment of the present invention.
Figure 5B:
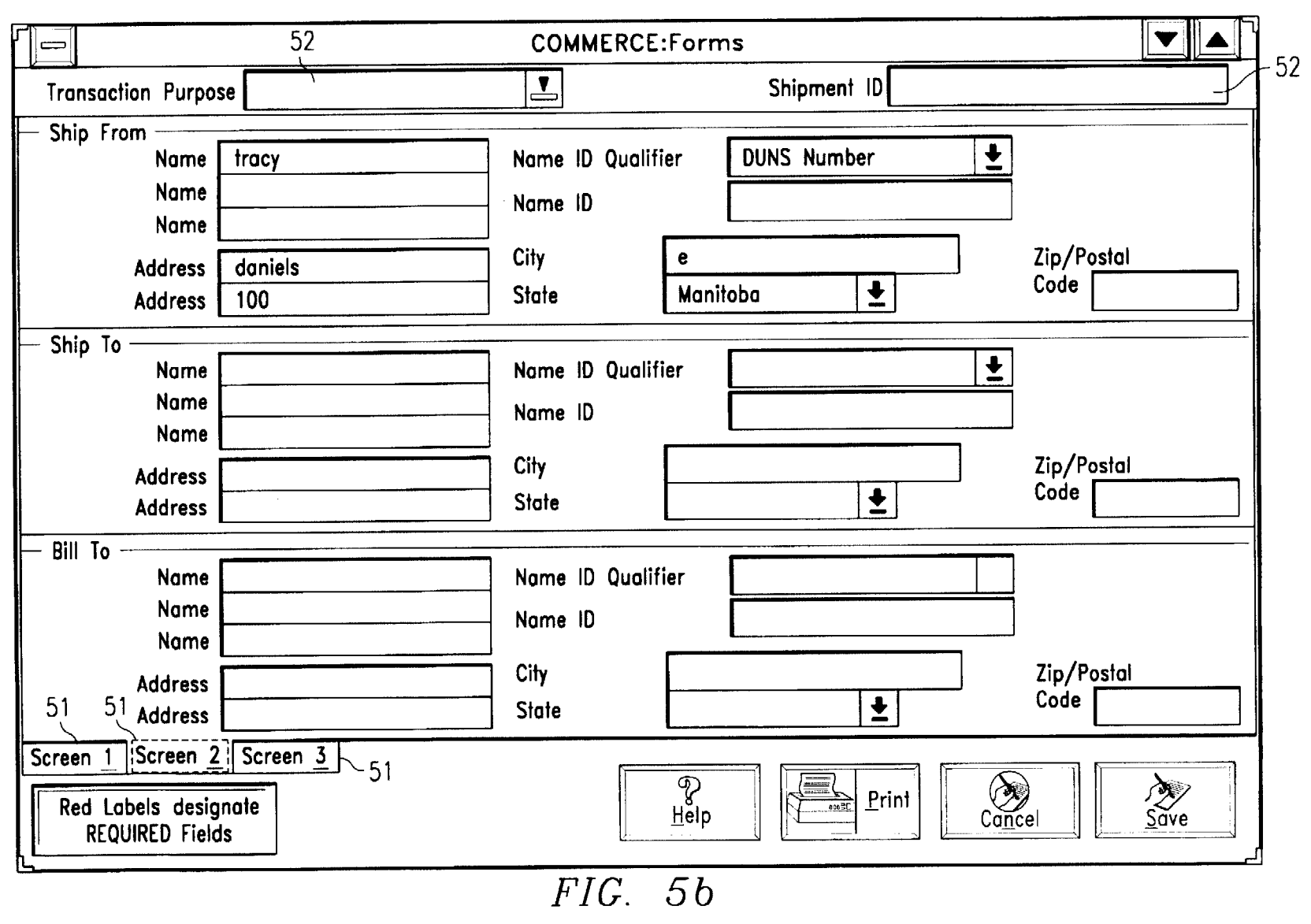
Figure 5C:
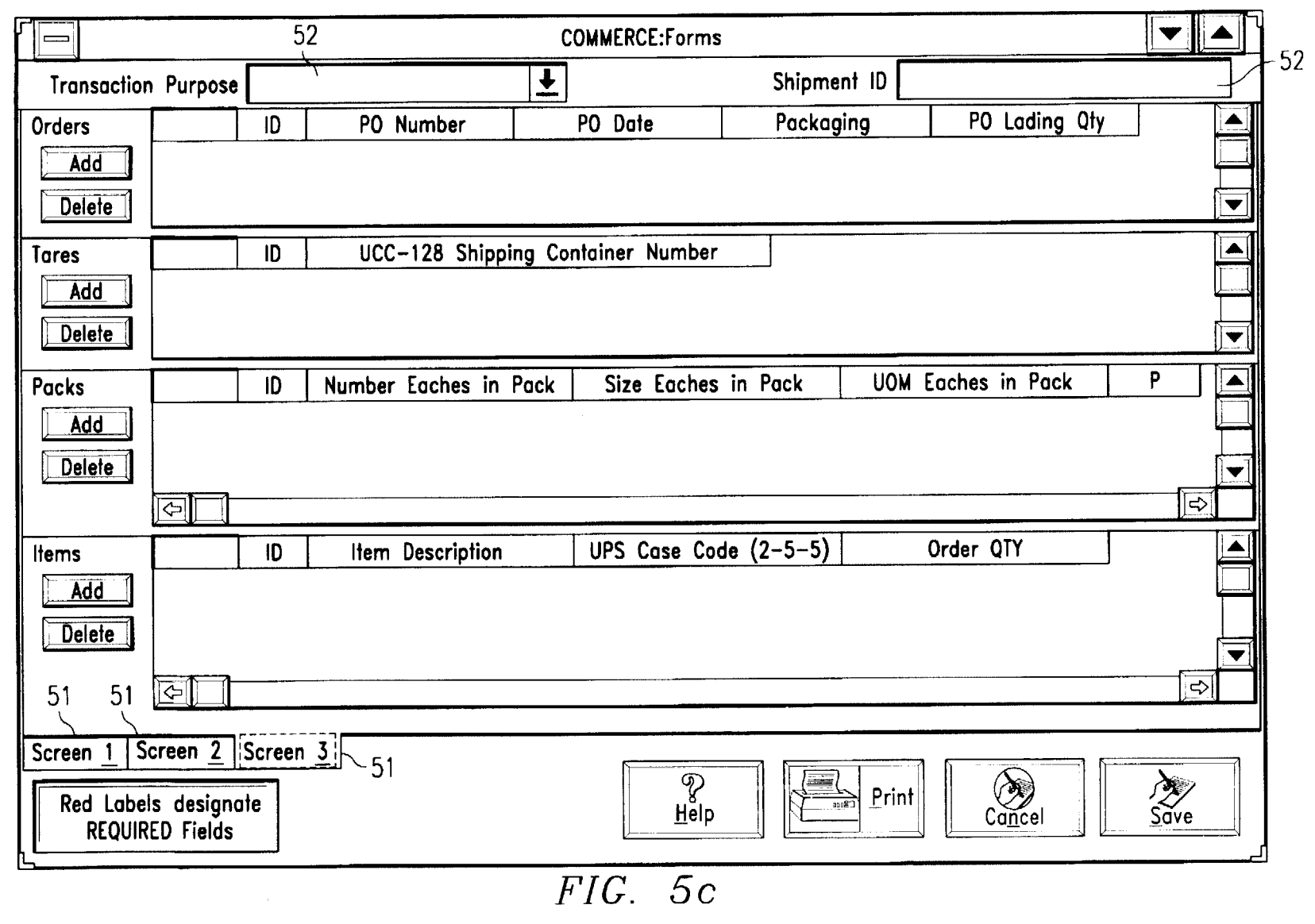

The first functional module within electronic forms application 35 is database engine 354. Database engine 354 provides electronic forms application 35 with database support so information within a database can be accessed from electronic forms application 35. In a preferred embodiment, the database engine is the Access™ database engine manufactured by MicroSoft, Inc. The inclusion of a database engine in electronic forms application 35 enables a catalog, for example, to be downloaded into the form, and accessed from the form. In the above example where a sponsor client 20 provides user client 30 with an electronic purchase order, sponsor client 20 may want to include a catalog of their products and prices as well. Without the catalog, user client 30 may experience difficulty utilizing the electronic purchase order because user client 20 may not know, for example, the specific catalog numbers of the products desired. The inclusion of database engine 354 allows sponsor client 20 to include a database containing catalog information, for example, product numbers and pricing information, so user client 30 may access the information necessary to complete the form. The catalog may be accessed, for example, by actuating a catalog button 43 on GUI 351 (FIG. 4b). Actuating catalog button 43 will open a window on the screen where a user can view the catalog and select the product desired. In another embodiment, the catalog may simply be accessed by entering the first few characters of the desired item in the information field. That is, in response to the entry of the first character or characters, electronic forms application 35 will access and open the database highlighting the first entry which contains the characters entered. In yet another embodiment, database access may occur through a combobox. As is known in the art of visual programming, a combobox is a Windows™ based control, such as the box 52 in FIG. 5c, which allows a user to either enter text into the box or fill in the box from a pull down list accessed through button 52a. For example, in FIG. 5a, actuating button 52a will open up list which will display the contents of a database of all available options to fill in the transaction purpose box. Database access could be through a list box as well. The database is preferably displayed in the form of a spreadsheet. Further, in a preferred embodiment, electronic forms application 35 is OLE enabled so that the user can simply drag and drop the necessary information from the catalog onto the detail line of the detail section 44 of the electronic purchase order.

The second functional module within electronic forms application 35 is sponsor control module 355. Sponsor control module 355 allows sponsor client 20 to communicate with and control the configuration and functionality of electronic forms application 35. Thus, sponsor control module 355 operates in connection with communications and routing module 353. One example of sponsor control functionality is the downloading of new files to electronic forms application 35. These new files comprise, for example, data files used by electronic forms application 35 to update a database. For example, sponsor control module 355 enables sponsor client 20 to download files to electronic forms application 35. That is, sponsor control means enables sponsor client 20 to manage the configuration of user client 30 by, for example, limiting or expanding the acceptable choices for certain information fields. With reference to the electronic purchase order shown in FIGS. 4a and 4b , as discussed above, actuating button 45 will open a combobox of all locations to which sponsor client 20 may ship merchandise (or of all locations at which sponsor client will accept shipment depending on which direction the form is being used). These locations, however, may change over time. Sponsor control module 355 allows electronic forms application 35 to accept an updated file containing a new list of ship to locations sent by sponsor client 20 through VAN 90. This functionality essentially allows sponsor client 20 to control the options of user client 30. When the updated file is received by user client 30, communications and routing module 353 determines whether the file is an update file or an EDI transmission by inspecting the communications envelope, for example for a the presence of a file update flag. If communications and routing module 353 determines the communication comprises a file update, sponsor control functionality is accessed to update the necessary file in electronic forms application 35. Note that while such a file update is taking place, the functionality of electronic forms application 35 is generally temporarily disabled.

Another example of sponsor control functionality present in electronic forms application 35 is the generation of a functional acknowledgment. For example, sponsor client 20 may want confirmation that a particular EDI transaction sent to a user client 30 has been received. In such a situation, sponsor client 20 includes a code in the transaction set header of the transaction to be confirmed. When that EDI transaction is received by user client 30, the transaction is routed to translator 352 by communications and routing module 353. Translator 352 reads the code in the transaction set header and causes electronic forms application 35 to access sponsor control functionality of module 355. In response, sponsor control functionality automatically generates a return message to sponsor client 20 indicating the transaction was received by user client 30.

The next functional module is turn-around module 356. Turn-around functionality is the ability of user client 30 to generate a turn-around document in response to a document received from sponsor client 20. Certain commercial documents are paired so that when one document of the pair is received, the recipient generates the second document of the pair in response and sends it the originator of the first document. The second document is termed a turn-around document. A purchase order and advance ship notice are one example of a paired set of documents with the advance ship notice being the turn-around document. Turn-around functionality enables electronic forms application 35 to automatically generate such turn-around documents. In a preferred embodiment, turn-around functionality is accessed from a "doc turn" button on the tool bar of the main menu. When the doc turn button is actuated, a dialog is opened which allows an operator of user client 30 to select which document is being responded to by document number and which turn-around document is being generated. When the turn-around document has been selected, the information fields of the GUI representing the turn-around document are populated with information from the original electronic form. For example, when a sponsor client 20 is making a purchase from a user client 30, sponsor client 20 can specify that when user client 30 receives an electronic purchase order via EDI from sponsor client 20, user client 30 is automatically prompted to generate an advance ship notice. User client 30 then accesses the turn-around functionality from the tool bar of the main menu, inputs the document number of the purchase order and chooses the advance ship notice. In response, electronic forms application 35 generates the GUI for the advance ship notice and populates the information fields of the GUI for the advance ship notice with the information from the purchase order which is appropriate for the advance ship notice, for example, the item information, and the ship to location. User client 30 then supplements the information contained in the advance ship notice as necessary by inputting information not contained in the purchase order, for instance, ship from location and invoice number. The turn-around document capability helps to ensure prompt turn-around time for sponsor client 20 and significantly simplifies generation of turn-around documents for user client 30.

The next functional module is display support module 357. Display support module 357 provides visual feedback devices which enable a user client 30 to better utilize electronic forms application 35. Electronic forms application 35 may include any of a number of visual feedback devices, for example, pop-up windows and grid displays. Pop-up windows are windows which open or "pop-up" when a display button is actuated, for example, button 46 on GUI 351 shown in FIG. 4a. The pop-up window opened when button 46 is actuated displays a calendar, for example, to assist the user in entering information in the requested ship date box of the electronic purchase order. Further, in keeping with the instant editing functionality of electronic forms application 35, the calendar displayed in response to actuating button 46 may display days on which shipment is available differently from days on which shipment is not available. For example, if a shipper does not ship on Saturdays and Sundays, those days may be blacked out on the calendar displayed. Pop-up windows are also useful for other controls, for example, time controls. Time control windows operate similarly to calendar windows by displaying, for example a clock face with the present time. Further, time control windows may operate in conjunction with calendar windows. For example, the hours of operation of a particular business on a particular date (chosen through use of a calendar window) may be displayed on a clock face differently than the hours which that particular business is closed on that particular day.

A second type of display control is a grid display. The grid display ability enables a user of electronic forms application 35 to display and scroll through a table of information on the screen. This ability is useful, for example, in conjunction with database engine 354 to display the contents of a database. In a preferred embodiment, the grid display is provided by incorporating grid functionality from a third party source into electronic forms application 35. One example of such a third party source for grid functionality is the True Grid™ product. In another embodiment, electronic forms application 35 obtains grid functionality through a visual programming language with which it was created. One example of such a visual programming language is Visual Basic™.

An additional functional module is help module 358. Help module 358 provides electronic forms application 35 with functionality to educate user client 30 about the capabilities of electronic forms application 35 and how to utilize those capabilities. Help functionality provided with electronic forms application 35 takes various forms. For example, electronic forms application 35 is typically provided with an on-line help function which is accessible, for example, through help button 47, shown in FIG. 4a. In one embodiment, when help button 47 is actuated, a dialogue is displayed which allows a user to choose from a number of topics on which the user desires information. Further, actuating help button 47 may also allow a user to execute a tutorial providing general information about the operation of electronic forms application 35.

A second type of help functionality which might be provided are hover windows. A hover window is a small window (small in relation to the size of the screen display) which is generated when a particular control (for example a button on GUI 351) receives cursor focus and generally contains a label explaining the function of the control. In a preferred embodiment, electronic forms application 35 is built in Visual Basic™ and the hover window functionality is provided by the VB Tips functionality of Visual Basic™.

In one embodiment, electronic forms application 35 is a customized application developed for the specific needs of a sponsor client. Electronic forms application 35 is built with any programming language. In a preferred embodiment, electronic forms application is built in a visual programming language such as Visual Basic™. In a preferred embodiment, electronic forms application 35 is a customized Commerce Forms™ application developed by Sterling Software, Inc. located in Dublin, Ohio.

In another embodiment, electronic forms application 35 is an industry tool kit. In this case, the application is preferably tailored to the needs of a particular industry, rather than meeting the needs of a particular sponsor, and comprises electronic versions of the business documents typically used in that industry. Further each electronic form within electronic forms application 35 typically comprises all of the fields which are used by members of that industry. For example, an electronic forms application 35 for the retail industry comprises electronic versions of a purchase order, an advance ship notice and an invoice in the ANSI x12 standard. Other industries in which such an industry tool kit would be useful include, for example, the grocery industry and the transportation industry. In a preferred embodiment, electronic forms application 35 is one of the Commerce Form™ industry tool kits offered by Sterling Software, Inc. located in Dublin, Ohio.

The industry tool kit electronic forms application 35 may contain all of the functionality outlined above. Some of the functionality, however, requires user setup in order to function. This is typically accomplished when the electronic forms application is installed on a user's computer. For example, the industry tool kit electronic forms applications allows a user to create a database file containing catalog information. Through a setup menu, a user of the electronic forms application can either download a file into the electronic forms application if the file is in a format which is compatible with or which can be converted to a format compatible with the electronic forms application or manually input data into a database.

Figure 7:
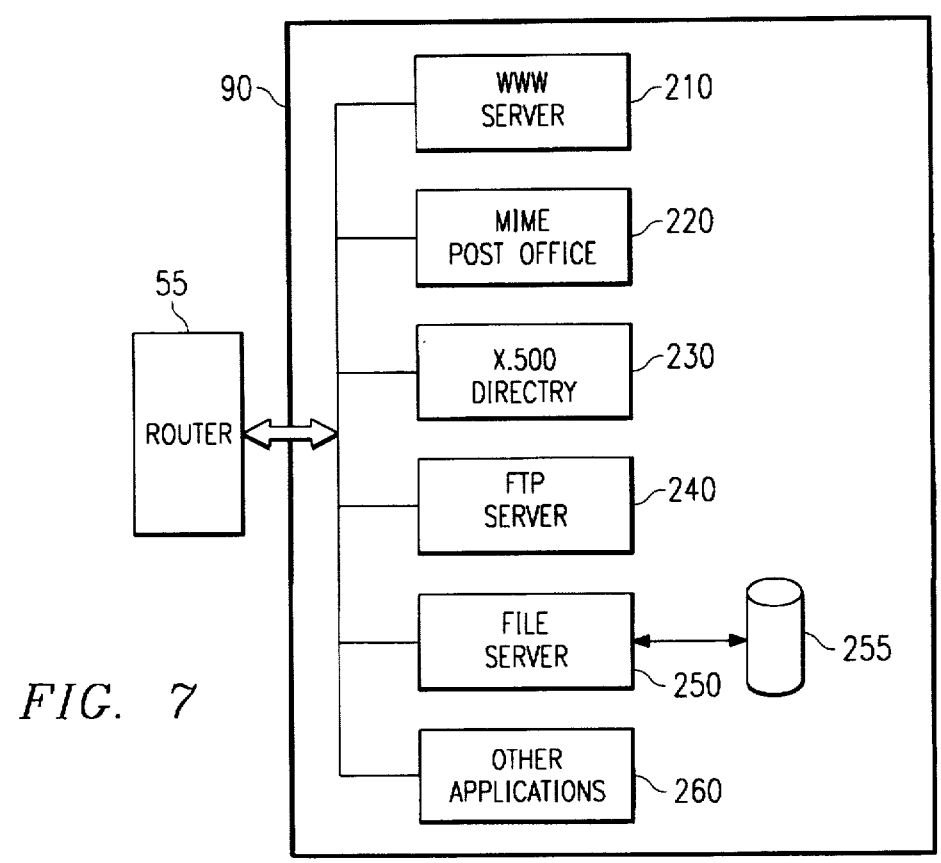
FIG. 7 depicts a functional block diagram of a value-added network according to one embodiment of the present invention.

FIG. 7 illustrates VAN 90 in more detail. As mentioned above, the particular applications resident on VAN 90 may differ from those described below without departing from the scope or spirit of the present invention. In general, the applications available on VAN 90 are accessible by all capable clients. Note, however, that user clients 30 generally comprise computers of limited capability and thus may be unable to utilize the various applications on VAN 90. It should be noted that VAN 90 is preferably implemented as an Ethernet network providing access to each of the below described applications or similar applications.

The first exemplary application running on VAN 90 is world wide web server 210. World wide web server 210 may contain various world wide web pages managed and maintained by the operator of VAN 90 or its subscribers. These world wide web pages may be accessed by sponsor clients 20 or by other processors or terminals having authorization to access data through VAN 90.

Next, MIME post office 220 is preferably provided to allow sponsor clients 20 and user clients 30 to access their mail, process it and determine the ultimate status of mail. MIME post office 220 may interface with VAN subscribers and other users for receiving mail therefrom and transmitting mail thereto.

X.500 directory 230 may be maintained at VAN 90 as discussed to provide an open platform allowing sponsor client 20 to access information about subscribers such as their addresses and desired trading partners.

FTP server 240 contains various files and data which is maintained on VAN 90 for transmission to subscribers if so desired. File server 250 similarly downloads data and files which may be maintained on storage device 255.

As would be obvious to one of ordinary skill in the art, various other applications may also reside on VAN 90 so that they may be remotely accessed by sponsor clients 20. This group of applications is illustrated in FIG. 7 as box 260.

Considering the above description of sponsor client 20, user client 30 and VAN 90 and the communications therebetween, the specific operation of the system is now described in additional detail. Communications between sponsor client 20 and VAN 90 and user client 30 and VAN 90 proceed in a similar fashion. Therefore only the communication between user client 30 and VAN 90 will be explained with differences noted where appropriate. In a typical implementation, a user, sitting at user client terminal 30 will initiate communication with VAN 90 through a electronic forms application 35. In one embodiment user client 30 communicates with VAN 90 through DDC 70. In contrast, sponsor client 20 may be prompted to select either PCN 60 or DDC 70 as a communications path to VAN 90. In either case, a PPP communication protocol is preferably used so that user client 30 may concurrently process multiple sessions executing multiple applications with data exchange between user client 30 and VAN 90. Alternatively, a SLIP protocol or any other agreed upon protocol providing multiple concurrent sessions over PCN 60 and DDC 70 may be used. In another embodiment, for sponsor client 20 a communications path (PCN 60 or DDC 70) is automatically selected depending on the particular application(s) being accessed. Automatic selection may alternatively be made on the basis of the availability and status (e.g. the response time or extent of current traffic) of either or both of PCN 60 or DDC 70.

For user clients 30, communications and routing module 353 then operates to automatically dial up the local number for establishing DDC 70 and interconnecting with an online service as mentioned above. Communications and routing module 353 also initiates a logon script to connect user client 30 with VAN 90 and thus allows user client 30 to access a network mailbox through MIME post office 220. With access to MIME post office 220, user client 30 may exchange EDI data with sponsor client 20 and is thereby rendered EDI-capable.

For sponsor client 20, upon selection of PCN 60 or DDC 70, switch 25 operates to automatically dial up the local number for DDC 70 access or PCN 60 access as required. As will be described below, switch 25 comprises an application for selecting among a plurality of logon scripts, each of the logon scripts causing the call to be routed to a different host.

In the case of DDC access and in particular X.25 access, PPP packets are tunneled through that network. Prior to being sent to a particular application resident on VAN 90, the X.25 formatting information is preferably stripped off of the data stream and the PPP packets will be converted to TCP/IP.

Where sponsor client 20 (or user client 30) accesses VAN 90 through PCN 60 and in particular the Internet, PPP packets are transmitted through that network by dialing up a PPP terminal server of an Internet service provider. PPP packets are transmitted directly to VAN 90. In this case the logon script is set up to point to the Internet rather than to the VAN 90 IP address.

For sponsor client 20, the transmission of PPP over X.25 is established as follows. First, an X.25 connection is established. This is preferably accomplished via a local dial to an X.25 provider's Point of Presence (POP). A scripting language is used to logon and route the call to VAN 90. Once X.25 connectivity is established, a PPP session is brought up. This is controlled by PPP software running on sponsor client 20 and by routers 45 and/or 55. Router 45 and/or 55 assigns sponsor client 20 a dynamic IP address. Once PPP connectivity is established, there exists an open communication pipe for the IP to use. In practical terms, the PPP protocol data is wrapped in X.25 packet envelopes that are opened and re-routed at the VAN 90 site. The procedure is similar when SLIP is used in place of PPP.

For the embodiment where user client 30 uses electronic forms application 35 and an external communications program to establish communications with value-added network 90, communications proceeds as described above with respect to sponsor client 20 selectively choosing a communications path.

Although the present invention has been described in detail, it should be understood that various changes, substitutions, and alterations can be made without departing from the intended scope as defined by the appended claims.

We claim:

1. An electronic forms application comprising:
   a graphical user interface (GUI) displayed on a computer display, said GUI comprising a plurality of information accepting fields operable to accept information entered therein;
   verification means for verifying information entered into the information accepting fields;
   translation means for translating information within the information accepting fields from a first data format to a second data format, said translation means operable to translate human-readable data into EDI data and EDI data into human-readable data;
   communication means operable to transmit and receive information for the information accepting fields; and,
   sponsor control means enabling a sponsor of the electronic forms application to control functionality of the electronic forms application from a location remote from the electronic forms application.

2. The electronic forms application of claim 1 wherein said verification means comprises means operable to compare information entered into an information accepting field against a database of acceptable entries.

3. The electronic forms application of claim 1 wherein said verification means comprises means operable to compare information entered into an information accepting field against an acceptable format.

4. The electronic forms application of claim 1 wherein the communication means comprises means operable to communicate with a modem to send and receive EDI data.

5. The electronic forms application of claim 1 wherein the communication means comprises means operable to receive EDI data; and
   wherein EDI data received by said communication means is translated into human readable data and entered into one of the plurality of information accepting fields by the translation means.

6. The electronic forms application of claim 1 wherein the communication means comprises means operable to transmit EDI data; and
   wherein EDI data transmitted is translated from human readable data into EDI data by the translation means.

7. The electronic forms application of claim 1 wherein the communication means comprises means operable to transmit and receive information for the information accepting fields through a value-added network.

8. The electronic forms application of claim 1 further comprising means for generating a turn around document in response to receipt of information by the communication means.

9. The electronic forms application of claim 1 further comprising means for assisting a user of the electronic forms application, said means for assisting operable to provide instructions to the user of the electronic forms application on how to use a particular electronic form.

10. The electronic forms application of claim 9 wherein the means for assisting a user of the electronic forms application comprises means for providing on-line help functionality.

11. The electronic forms application of claim 9 wherein the means for assisting a user of the electronic forms application comprises means for providing display windows comprising explanations of controls of said GUI.

12. The electronic forms application of claim 1 wherein the sponsor control means comprises means operable to download a data file to the electronic forms application.

13. The electronic forms application of claim 12 wherein the data file comprises a plurality of selections for an information accepting field presented to the customer via the electronic forms application.

14. The electronic forms application of claim 1 wherein the sponsor control means comprises means operable to generate a functional acknowledgment in response to a request from the sponsor of the electronic forms application.

15. A method for conducting EDI using an electronic forms application comprising:
   entering information into information accepting fields of a graphical user interface of the electronic forms application in human-readable form;
   verifying the information entered into the information accepting fields;
   controlling the functionality of the electronic forms application from a location remote from the electronic forms application;
   translating the verified information from human-readable form into EDI data; and,
   transmitting said EDI data though an EDI network.

16. The method of claim 15 wherein verifying comprises comparing the information entered into an information accepting field against a database of acceptable entries.

17. The method of claim 15 wherein verifying comprises comparing the information entered into an information accepting field against an acceptable format.

18. The method of claim 15 further comprising a step of receiving EDI data from an EDI network and generating an EDI transmission in response to the received EDI data.

19. The method of claim 15 wherein the step of controlling the functionality of the electronic forms application comprises the step of downloading a data file to the electronic forms application from a location remote from the electronic forms application.

20. The method of claim 19 wherein the data file comprises a plurality of selections for an information accepting field presented to the customer via the electronic forms application.

21. An electronic form processing system comprising:
   a value-added network;
   at least one EDI capable computer connected to said value-added network, said EDI capable computer comprising:
      at least one application running on said EDI capable computer;
      an EDI translator;
      an application-EDI interface; and
      a data communications means; and
   at least one non-EDI capable computer connected to said EDI network, said non-EDI capable computer comprising:
      a data transmission means; and, an electronic forms application, said electronic forms application comprising:
         a graphical user interface (GUI) displayed on a display of said non-EDI capable computer, said GUI comprising a plurality of information accepting fields operable to accept information entered therein;
         verification means for verifying information entered into the information accepting fields;
         translation means for translating information within the information accepting fields from a first data format to a second data format, said translation means operable to translate human-readable data into EDI data and EDI data into human-readable data;

communication means operable to transmit and receive information for the information accepting fields; and, sponsor control means enabling a sponsor of the electronic forms application to control functionality of the electronic forms application from a location remote from the non-EDI capable computer;

wherein said electronic forms application enables the non-EDI capable computer to transmit EDI data to and receive EDI data from the value-added network using the data transmission means.

22. The system of claim 21 wherein the information accepting fields are operable to accept manual entry of transaction information to be transmitted to the EDI capable computer.

23. The system of claim 22 wherein the verification means further comprises means operable to perform content-level verification for information manually entered into the information accepting fields.

24. The system of claim 22 wherein the verification means further comprises means operable to perform format based verification for information manually entered into the information accepting fields.

25. The system of claim 21 further comprising means for assisting a user of the electronic forms application, said means for assisting providing instructions to the user of the electronic forms application on how to use an electronic form.

26. The system of claim 25 wherein the means for assisting a user of the electronic forms application comprises means for providing on-line help functionality.

27. The system of claim 25 wherein the means for assisting a user of the electronic forms application comprises means for providing display windows comprising explanations of controls of said GUI.

28. The system of claim 21 wherein the electronic forms application further comprises means for generating a turn around document in response to receipt of information by the data communication means.

29. The system of claim 21 wherein the sponsor control means comprises means operable to download a data file to the electronic forms application.

30. The system of claim 21 wherein the sponsor control means comprises means operable to generate a functional acknowledgment in response to a request from the sponsor of the electronic forms application.

31. An electronic forms processing system comprising:
a plurality of clients;
at least one EDI capable client;
at least one non-EDI capable client;
a value-added network;
each of said EDI capable client and said non-EDI capable client communicating with the value-added network through a communications network;
said at least one non-EDI capable computer comprising an electronic forms application, said electronic forms application comprising a graphical user interface and a configuration management means, said configuration management means enabling said EDI capable client to control the configuration of said electronic forms application from a location remote from the non-EDI capable computer.

32. The electronic forms processing system of claim 31 wherein each client communicates with other clients and with the value-added network through a switch, each switch enabling selective connection to the value-added network through a public communications network and a direct dialup connection.

33. The electronic form processing system of claim 31 wherein the configuration management means comprises means operable to download a data file to the electronic forms application from a location remote from the non-EDI capable computer.

34. The electronic form processing system of claim 33 wherein the data file comprises a plurality of selections for an information accepting field presented to the customer via the electronic forms application.

* * * * *